US010355939B2

(12) United States Patent
Schmatz

(10) Patent No.: US 10,355,939 B2
(45) Date of Patent: Jul. 16, 2019

(54) SCALABLE DATA CENTER NETWORK TOPOLOGY ON DISTRIBUTED SWITCH

(71) Applicant: International Business Machines Corporation, Armonk, NY (US)

(72) Inventor: Martin Leo Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/486,878

(22) Filed: Apr. 13, 2017

(65) Prior Publication Data

US 2018/0302288 A1 Oct. 18, 2018

(51) Int. Cl.
*H04L 12/24* (2006.01)
*H04L 12/715* (2013.01)
*H04L 12/26* (2006.01)
*H04L 29/08* (2006.01)

(52) U.S. Cl.
CPC .......... *H04L 41/12* (2013.01); *H04L 41/0893* (2013.01); *H04L 67/1097* (2013.01)

(58) Field of Classification Search
CPC ............................. H04L 41/12; H04L 67/1097
See application file for complete search history.

(56) References Cited

U.S. PATENT DOCUMENTS

| | | | |
|---|---|---|---|
| 8,065,433 B2 | 11/2011 | Guo et al. | |
| 8,335,213 B2 | 12/2012 | Sindhu et al. | |
| 9,166,886 B1 | 10/2015 | Kabbani et al. | |
| 9,288,555 B2 | 3/2016 | Srinivas et al. | |
| 2010/0020806 A1 | 1/2010 | Vandat et al. | |
| 2014/0258485 A1 | 9/2014 | Yang et al. | |
| 2015/0163120 A1* | 6/2015 | Chinnaiah Sankaran | ................... H04L 43/0888 709/224 |

(Continued)

FOREIGN PATENT DOCUMENTS

CN 103327095 B 3/2016

OTHER PUBLICATIONS

International Search Report and Written Opinion, PCT/IB2018/052457, dated Jul. 25, 2018.

(Continued)

*Primary Examiner* — Kiet Tang
(74) *Attorney, Agent, or Firm* — Harrington & Smith

(57) ABSTRACT

A method is provided for networking nodes in a data center network structure, including connecting at least ten base units each including connected nodes with southbound connections of a multi-host NIC controller having northbound a higher total bandwidth than southbound, the controllers configured as dragonfly switches; connecting the ten base units with their respective controllers in a modified Peterson graph form as an intragroup network to build a super unit including three groups, where each controller uses three northbound connections for a direct connection to three other base units of the super unit, and in which two base units of each group are connected via a respective one of a fourth northbound connection to one of the other groups, and a remaining base unit not being part of one of the groups is adapted for using three northbound connections for direct connection to one base unit in each group.

22 Claims, 11 Drawing Sheets

(56) References Cited

U.S. PATENT DOCUMENTS

2016/0285741 A1* 9/2016 Jacob ................ H04L 45/04

OTHER PUBLICATIONS

"Scale-Out Networking in the Data Center", Published by the IEEE Computer Society, (2010), (13 pages).
Abts, et al., "A Guided Tour through Data-center Networking", (2012), (14 pages).

* cited by examiner

SCALABLE DATA CENTER NETWORK TOPOLOGY ON DISTRIBUTED SWITCH

FIELD OF THE INVENTION

The invention relates generally to a data center network structure, and more specifically, to building a data center network structure with a plurality of nodes reflecting all constraints of the networking aspect. The invention relates further to a method for networking a plurality of nodes in a data center network, and a computer program product.

BACKGROUND

Cloud computing data centers grow constantly in terms of size and capabilities. This includes the number of computing nodes. Computing nodes may be seen as one of three elements of a data center: nodes, switches and network connections. Additionally, routing protocols need to be taken into account. Today, cloud data centers (DC) host many thousands of active nodes, with a trend to go to tens of thousands nodes per data center. Each node can be a server (single, SMP [symmetrical multi-processing], small cluster), storage or an accelerator. All those nodes need to be inter-connected via one (or several) partial DC networks. Many network topologies are known and well understood today: Many versions of tree structures (all-to-all (aka "full mesh"), 2D/3D mesh2D/3D torus, tree, fat tree, XGFT, dragonfly, Dragonfly+, 2 Tier dragonfly, Hamming graph, HyperX and many more), each with one or several network levels. Generally, for cloud computing data centers there are some basic goals: increasing the number of inter-connected nodes, having performance-efficient routing protocols and achieving the above goals while meeting important boundary conditions like costs, latency and bandwidth (i.e., performance) as well as RAS features (reliability, availability and serviceability).

However, each network topology has the same fundamental issue: Given the number of nodes, physical space requirements of the nodes dictate that nodes will be spaced apart by more than what an electrical cable at high speed (10+ Gbps) can bridge (this is given by laws of physics). As a result, many optical cables will be required in addition to network switches to implement one of the above-mentioned network topologies. One (eventually extreme) example: For a 1024 node all-to-all network connection, 500,000 optical cables would be required. If those are 100 Gbps Ethernet connections each, at current street-price of ~$1,500/cable, this adds about $785 M to the cost of a DC, or $767 k per node! Hence, there is a need for a network structure which minimizes the number of optical (distance>~5 m) cables. More generally: traditional network topologies can address the node scaling aspect of cloud computing data centers, but it is extremely difficult to simultaneously optimize also other boundary conditions.

There are several disclosures related to data center network structures. Document US 2010/002-0806 A1 discloses a method comprising receiving a data packet at a switch coupled to a plurality of switches. The switch may determine, from a first level table comprising a plurality of prefixes, a prefix matching a first portion of a destination address of the received packet. The switch may also determine, from a second level table comprising a plurality of suffixes, a suffix matching a second portion of a destination address of the received packet when the matching prefix of the first level table is associated with the second level table. This structure is used for an implementation of a data center communication fabric providing scalable communication bandwidth with significant fault tolerance using a plurality of smaller individual switches of substantially the same size and capacity.

Document U.S. Pat. No. 9,166,886 B1 discloses a system for determining a physical topology of the network including a plurality of nodes. Each node includes a multi-chip higher-tier switch. Each chip in the multi-chip higher-tier switch includes a plurality of ports. A network configuration module is configured to assign physical connections to respective ports of chips of the higher-tier switches through an iterative process. The iterative process includes selecting a first route of a plurality of routes, is signing for the source node of the selected route, a first portion on a first chip having an odd number of free ports.

One disadvantage of known solutions lies in the fact that an optimization of the underlying network characteristics is mainly made according only to one as the possible variables like selected network architecture, number of ports per switch, network dimension (2D, 3D, nD), reach of one hop connection, number of total required hops, and so on.

However, there may be a need to overcome this limitation of an optimization in only one direction. This may apply in particular to an optimization reflecting the above-mentioned boundaries as well as related costs for short distance and long-distance network connections in a large data center comprising hundreds or thousands of nodes.

SUMMARY

This section is intended to include examples and is not intended to be limiting.

According to an example embodiment, a data center network structure comprising a plurality of nodes is provided. The data center network structure comprising: at least ten base units each of which comprise a first set of nodes connected by southbound connections of a multi-host NIC controller, said multi-host NIC controller having northbound a higher total bandwidth than southbound; and a super unit comprising the ten base units with their respective multi-host NIC controllers connected in a modified Peterson graph form as an intragroup network such that the ten base units of the super unit comprise three groups each including three of the ten base units, in which each of said multi-host NIC controllers is adapted for using three northbound connections for a direct connection to three other base units of the super unit, and in which two base units of each of the groups are connected via a respective one of a fourth intragroup northbound connection to one of said other two groups, and a remaining base unit out of said ten base units not being part of one of the three groups of three base units is adapted for using three northbound connections for a direct connection to one base unit in each of the three groups, and wherein said multi-host NIC controllers are configured as dragonfly switches.

According to another example embodiment, a method is provided for networking a plurality of nodes in a data center network structure. The method comprising: connecting at least ten base units each of which comprise a first set of connected nodes with southbound connections of a multi-host NIC controller, said multi-host NIC controller having northbound a higher total bandwidth than southbound, connecting the ten base units with their respective multi-host NIC controllers in a modified Peterson graph form as an intragroup network to build a super unit such that the ten base units of the super unit comprise three groups including three of the ten base units, in which each of said multi-host NIC controllers is using three northbound connections for a direct connection to three other base units of the super unit, and in which two base units of each of the groups are connected via a respective one of a fourth northbound connection to one of said other two groups of three base units, and a remaining base unit out of said ten base units not being part of one of the three groups of three base units is adapted for using three northbound connections for a direct connection to one base unit in each of the three groups, wherein said multi-host NIC controllers are configured as dragonfly switches.

According to yet another example embodiment, a computer program product is provided for networking a plurality of nodes in a data center network. The computer program product comprising a computer readable storage medium having program instructions embodied therewith, said program instructions being executable by one or more computing systems to cause said one or more computing systems to: connect at least ten base units each of which comprise a first set of connected nodes with southbound connections of a multi-host NIC controller, said multi-host NIC controller having northbound a higher total bandwidth than southbound, connect said the ten base units with their respective multi-host NIC controllers in a modified Peterson graph form as an intragroup network to build a super unit such that the ten base units of the super unit comprise three groups including three of the ten base units, in which each of said multi-host NIC controllers is using three northbound connections for a direct connection to three other base units of the super unit, and in which two base units of each of the groups are connected via a respective one of a fourth northbound connection to one of the other two groups, wherein said multi-host NIC controllers are configured as dragonfly switches.

BRIEF DESCRIPTION OF THE SEVERAL VIEWS OF THE DRAWINGS

Preferred embodiments of the invention will be described, by way of example only, and with reference to the following drawings.

DETAILED DESCRIPTION

Figure 1:
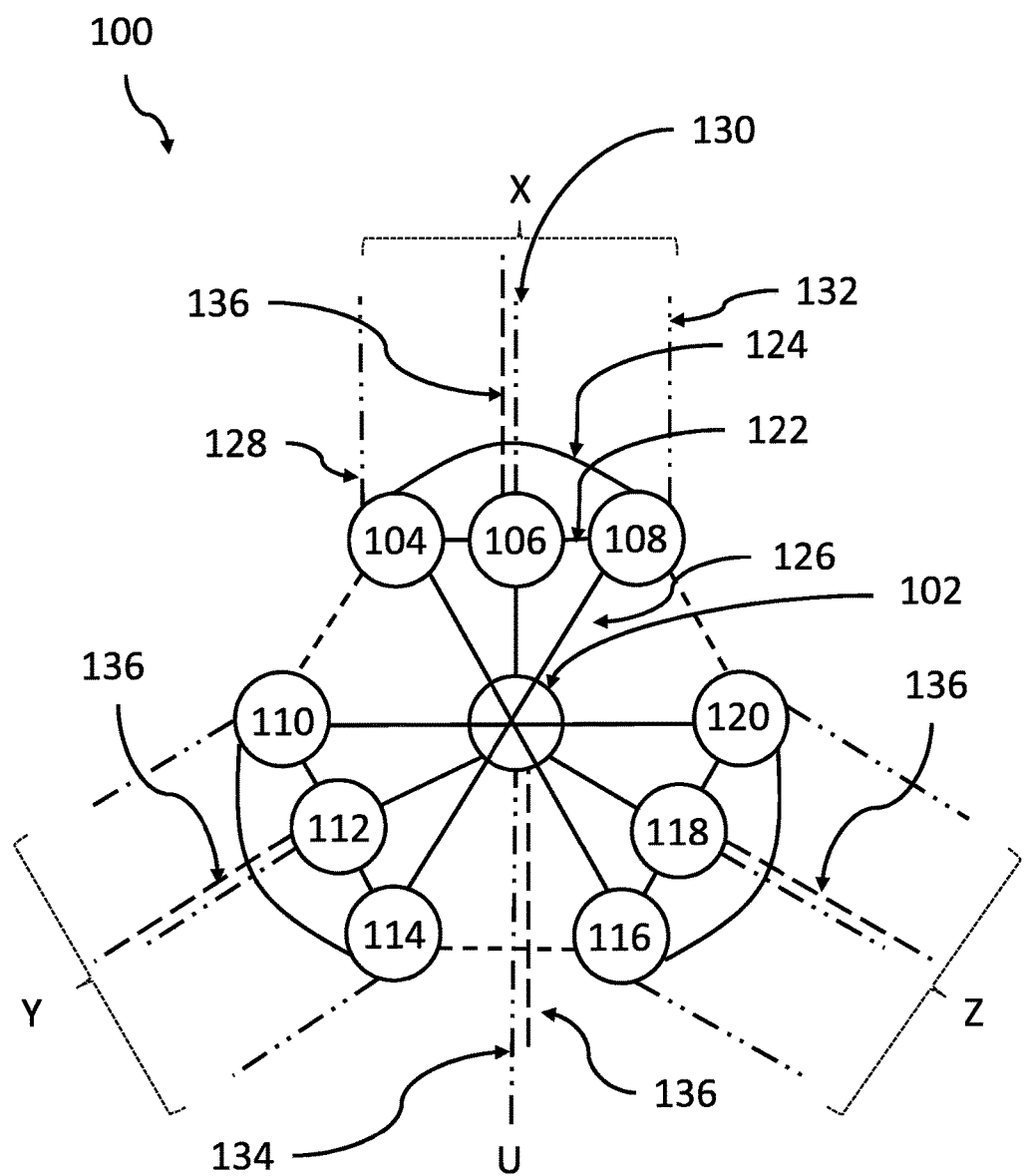
FIG. 1 shows a block diagram of a data center network structure in accordance with exemplary embodiments.

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive data center network structure is given. Afterwards, further embodiments, as well as embodiments of the method for networking a plurality of nodes in a data center network, will be described.

In the context of this description, the following conventions, terms and/or expressions may be used:

The term 'data center network structure' may denote the topology of a data exchange network between nodes in a data center comprising a plurality of architecture-wise homogeneous or heterogeneous nodes.

The term 'node' may denote a computing node, an accelerator node, a storage node or similar node equipped with at least one server and one multi-host NIC connector. The node itself may be configured with a single CPU or with a multiple CPU computing node. The node may also be denoted as base unit comprising a server and multi-host NIC controller. Given die available multi-host NIC controllers, versions with two, three or even four servers per multi-host NIC controller may also be possible.

The term 'base unit' may denote a node in a network topology, e.g., implemented as the just described node. The base unit may comprise a multi-host NIC controller using, e.g., a southbound PCIe based connection. However, alternative connection technologies between the server and the multi-host NIC controller are also possible. The base unit may also be denoted as a 'sled'.

The term 'multi-host NIC controller' may denote a network adapter supporting a single root IO virtualization (SR-VIO) implemented as hardware bridge that forwards network traffic between the physical ports of the adapter and internal virtual ports (VPorts). Such a bridge is also known as NIC switch. Each NIC switch comprises at least the following components: (i) one external, or physical, port that provides network connectivity to the external physical network. (ii) One internal report that provides a PCI Express (PCIe) Physical Function (FP) on the network adapter with access to the external physical network. The internal port is also known as a virtual port (VPort). The physical function may always have a VPort that may be created and assigned to it. This VPort is known as the default VPort, and may be referenced by the DEFAULT-VPORT-ID identifier. (iii) Furthermore, one or more VPorts are available that may provide a PCIe Virtual Function (VF) on the network adapter with access to the external physical network.

The term 'switch' or a network switch (also called switching hub, bridging hub, officially MAC bridge) is a computer networking device that connects devices together on a computer network, by using packet switching to receive, process and forward data to the destination device. Unlike less advanced network hubs, a network switch forwards data only to one or multiple devices that need to receive it, rather than broadcasting the same data out of each of its ports.

The term 'northbound' may denote the uplink side of a network switch. The expression is typically used in contrast to a southbound connection denoting the downlink side of a network switch.

The term 'total bandwidth' of a network switch may here denote the sum of all northbound ports of a network switch.

The term 'super unit' may denote a group of 10 base units—e.g., each base unit being configured with a minimum of one computing node and one multi-host NIC controller—connected in the here discussed modified Peterson graph form. The super unit may also be denoted as chassis with 10 base units or simply chassis.

The term 'dragonfly switch' may denote at least two network switches connected to each other in the form to build a virtual switch. A prerequisite may be that the sum of the northbound bandwidth is higher than the sum of the southbound bandwidth. The excess northbound capacity may be used as northbound switching capacity without compromising the performance and throughput of each individual switch (compare also FIG. 3).

The term 'server' may denote a component of a base unit in the form of a compute server, accelerator, and storage server or similar. The server, or a group of a first set of servers, may represent a node in the data network.

The term 'x-dimension unit' may denote a plurality of base units building one dimension of a data center network. In the here discussed embodiments, the x-dimension unit may comprise 4 super units—i.e., chassis—each chassis comprising 10 base units, i.e., nodes.

The term 'y-dimension group' may denote another dimension of the data center network topology. In the here discussed embodiments, the y-dimension may comprise 4 x-dimension units.

The term 'POD' may denote a plurality of more or less commoditized server components for creating a high-performance computing platform using bare 19 inch racks and populating them with servers having a form factor of 1 to 4 U. Further required components for a data center POD are networking and data switching and routing technologies used to transfer data between the different servers.

FIG. 1 shows a block diagram of an embodiment of a data center network structure in accordance with exemplary embodiments. The data center network structure comprises a plurality of base units 102, 104, ..., 120. Each of the base units comprises a first set of nodes. Each of the nodes may be a computing node, a storage node, an accelerator node or similar. Each of the nodes within base units 102, 104, ..., 120 is connected to southbound connections of a multi-host NIC controller. The nodes may be connected via a PCIe (Peripheral Component Interconnect Express) connection to the multi-host NIC controller in each one of the base units 102, 104, ..., 120. The multi-host NIC controller has a higher total bandwidth than southbound.

Ten of the base units 102, 104, ..., 120 build a super unit 100—also denoted as 'chassis'. The base units are connected in a modified Peterson graph form as an intragroup network. Each of the multi-host NIC controllers of the base units 102, 104, ..., 120 is adapted for using three northbound connections 122, 124, 126 for a direct connection to other three base units. The three connections per base unit 102, 104, ..., 120 are shown exemplarily using base unit 108 only. The just described three connections are—in case of base unit 108—denoted as 122, 124, 126 and they connect base unit 106, 104 and 102 with base unit 108 directly. A similar connection geometry with 3 connections can be identified in FIG. 1 for each of the base units 102, 104, ..., 120.

It may be noted that three groups of three base units, each exists in the super unit 100 in which only one hop is required to reach each member of the group. The groups are: (a) base units 104, 106, 108, (b) base units 110, 112, 114, (c) base units 116, 108, 120.

Furthermore, two base units of each group of three base units—namely those at the outer edges of each group, i.e., 104/108, 110/114 and 116/120, are connected via a respective one of a fourth northbound connection to one of the other two groups of three base units. As an example: base unit 104 of group (a) is connected to base unit 110 of group (b) and base unit 108 of group (a) is connected to base unit 120 of group (c). As can be seen, base unit 102 does not belong to any of the groups (a), (b), (c).

That way, it is guaranteed that a 1-hop connection exists within each group of 3 base units. It may also be noted that the multi-host NIC controllers are configured as dragonfly switches as will also be described later.

Additionally, it may also be noted that a base unit may comprise an above-described node type (computing node, storage node, accelerator node). In one embodiment, a base unit may be a sled comprising up to 4 nodes. However, exemplary a sled may comprise one dual socket (i.e., for 2 CPUs) server. Each CPU may have at least one related PCIe connection which is used to connect it to the multi-host NIC controller within the sled or base unit. A second PCIe connection may also be used to also connect a respective CPU to the multi-host NIC controller comprised in the server in order to double the available bandwidth from the server to the network. More details can be seen in FIG. 3.

Figure 2:
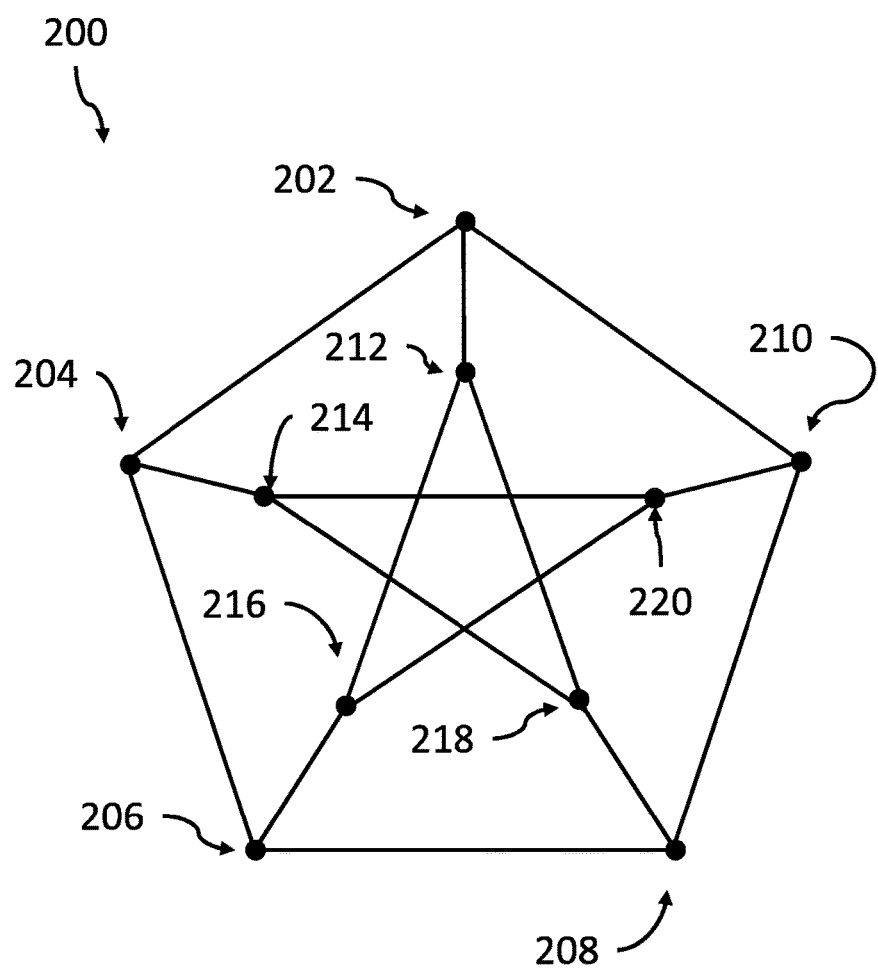
FIG. 2 shows a Peterson graph traditionally used for building networks in data centers.

FIG. 2 shows a Peterson graph 200 traditionally used for building networks in data centers. The nodes 202, 204, ..., 220 are connected in the shown way. Each link between two of the nodes 202, 204, ..., 220 represents a network connection. As can easily be seen, starting from any of the nodes 202, 204, ..., 220, a connection can be established with 2-hop to any other node in the Peterson graph form network. This is in contrast to the modified Peterson graph structure, as discussed above, which does not represent an all-to-all 2-hop network structure but allows a 1-hop connection in the sub-groups (a), (b), (c) of the modified Peterson graph form network. The Peterson graph structure type network will be used later-on.

Now coming back to FIG. 1 again: In the data center network structure 100, each base unit 104 ... 106, 110 ... 114, 116 ... 120 in each of the three groups (a), (b), (c) of three base units comprises at least one—the fifth one— northbound connection 128, 130, 132 (only those of the group (a) with base unit 104 ... 106 have reference numerals) such that each of the groups of three base units enables three group outbound connections. They are denoted as northbound x-dimension connections of the data center network structure, northbound y-dimension connections of the data center network structure and northbound z-dimension connections of the data center network structure.

In one embodiment, also the 'ungrouped' central base unit 102 comprises such an additional connection 134 which may serve as service connection to the intragroup network of the modified Peterson graph form or as I/O (input/output) connection for user data.

According to one embodiment each base unit in the groups of three base units not comprising a fifth northbound intragroup connection—i.e., the middle ones 106, 112, 118—also comprise an additional northbound electrical connection usable as additional service connections building four additional northbound connections 136 in a w-dimension of the data center network structure.

Figure 3:
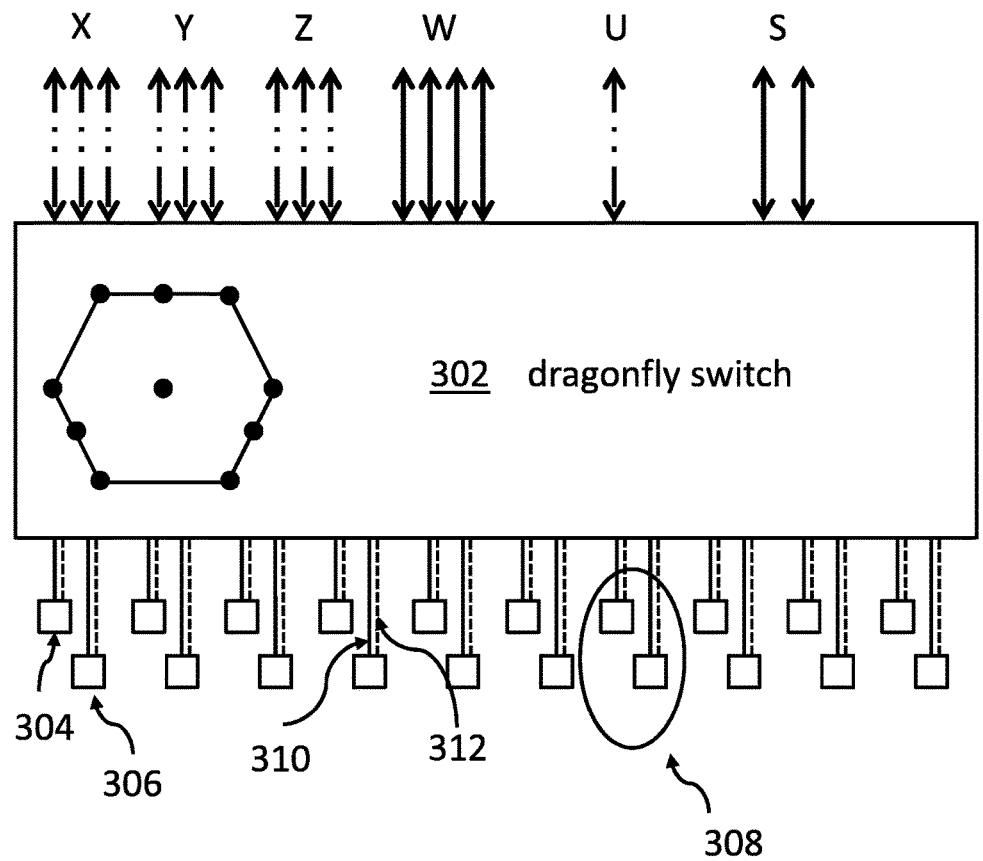
FIG. 3 shows the intragroup network of FIG. 1 as one block with nodes and the dragonfly switch in accordance with exemplary embodiments.

Combining all of the above, one arrives at FIG. 3, which shows the intragroup network of FIG. 1 as one block with nodes 308 (only one of the 10 with a reference numeral) and the (virtual) dragonfly switch 302 (explanation see further below) with possible network connections in an x-, a y-, a z- and a w-dimension. As can be derived from FIG. 1, there are 3 northbound connections in x-direction, 3 northbound connections usable for a y-direction, 3 connections in a z-direction and 4 connections in a w-direction in a data center network. Additionally, the u-connection (compare 134 of FIG. 1) as well as 2 additional potential service connections 's', are shown.

Exemplarily, 2 of the 10 times 2 boxes 304 and 306 (also with exemplary reference numbers) are encircled and represent a dual socket server. From each one of the 20 CPUs of the 10 servers, a solid line 310 (for clarity, only one exemplarily reference number is shown) represents a PCIe connection from the respective CPU to its multi-host NIC connector which builds in combination of all 10 multi-host NIC connectors the virtual dragonfly switch 302. The dotted line 312 (only one of the 20 exemplarily with ref.-num.) between a CPU and the virtual dragonfly switch 302 may represent—in an additional embodiment—a further optional PCIe connection from a CPU to the related multi-host NIC connector of the related base unit/sled (ref.-num. 102 . . . 120 of FIG. 1).

It is noted that connections other than a PCIe connection may also be used in other embodiments. It is further noted that for any described connection either electrical connection (cables) or optical connections (cables) may be used. However, using optical cables for physically longer distances is preferred.

Based in this core structure—also denoted as 'super unit' or 'chassis'—larger data center networks may be built. However, before detailing that aspect, some details of the multi-host NIC controller and the related and already referred dragonfly structure will be explained.

Figure 4:
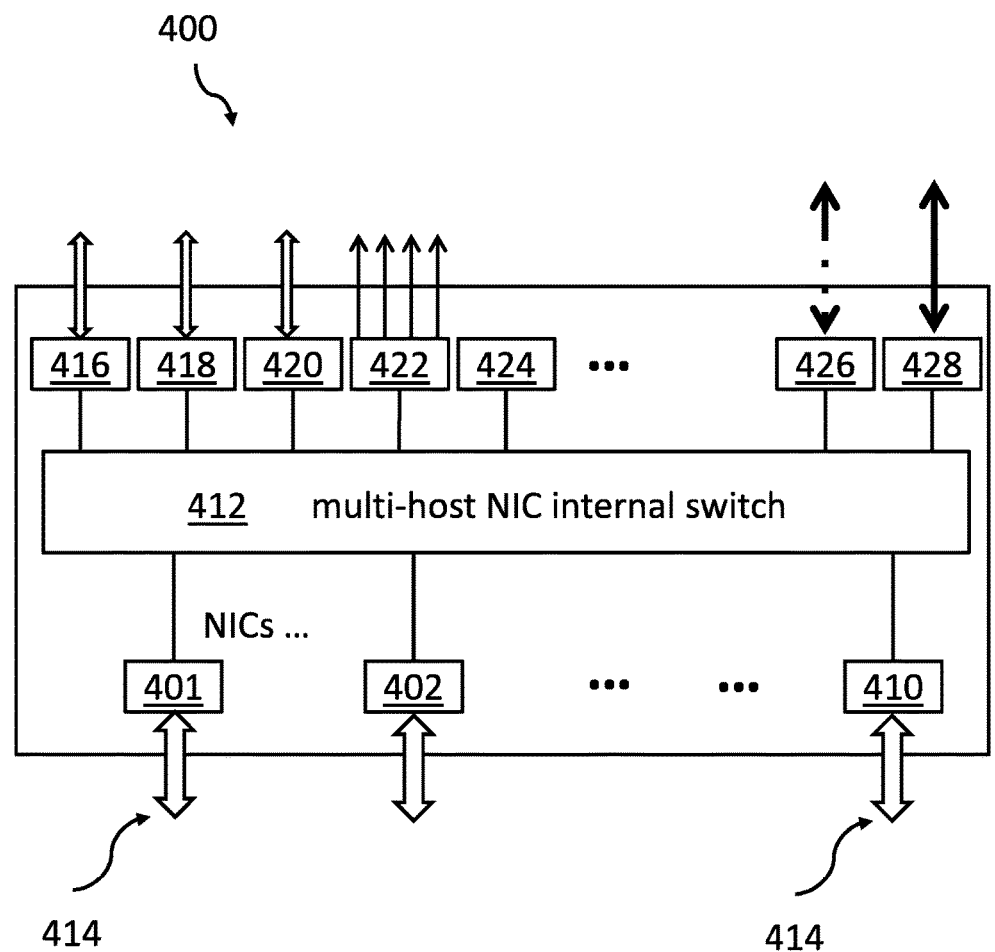
FIG. 4 shows a multi-host NIC connector in accordance with exemplary embodiments.

FIG. 4 shows an embodiment of a multi-host NIC controller 400. It may be operated as a network switch comprising a multi-host NIC internal switch 412. Southbound the multi-NIC internal switch 412 comprises network interface controllers 401, . . . , 410. Two nodes or servers may be connected using south-bound node connections 414, e.g., via PCIe connections. Northbound, a plurality of ports 416 . . . 428—e.g., groups of 4×25 Gbps connections—are available. They may be grouped according to different rules and priorities. The northbound ports 416 and 418 may—in one embodiment—be used as x-dimension all-to-all network using 3×100 Gbps connections for 10 base units per super unit, i.e., 10 sleds per chassis.

Four additional connections of port 422 may be used as additional RAS connections (Reliability, Availability, and Serviceability). Other ports 424 may be used optionally. Finally, ports 426 and 428 are used as 2 times 100 Gbps ports for scaling into the other dimensions, i.e., y-dimension, z-dimension and w-dimension. It may again be noted that all northbound connections to the multi-host NIC connector 400 may be enabled via electrical or optical cables. Also, it is worthwhile to mention that the multi-host NIC internal switch 412 may be, e.g., based on a Red Rock Connector from Intel.

Figure 5A:
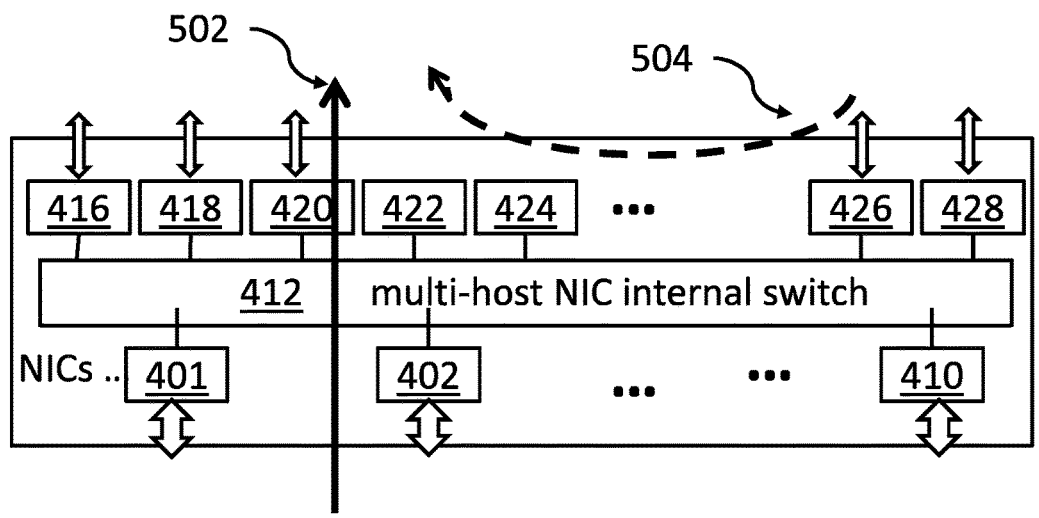
FIGS. 5a, 5b show the concept of a dragonfly switch in accordance with exemplary embodiments.
Figure 5B:
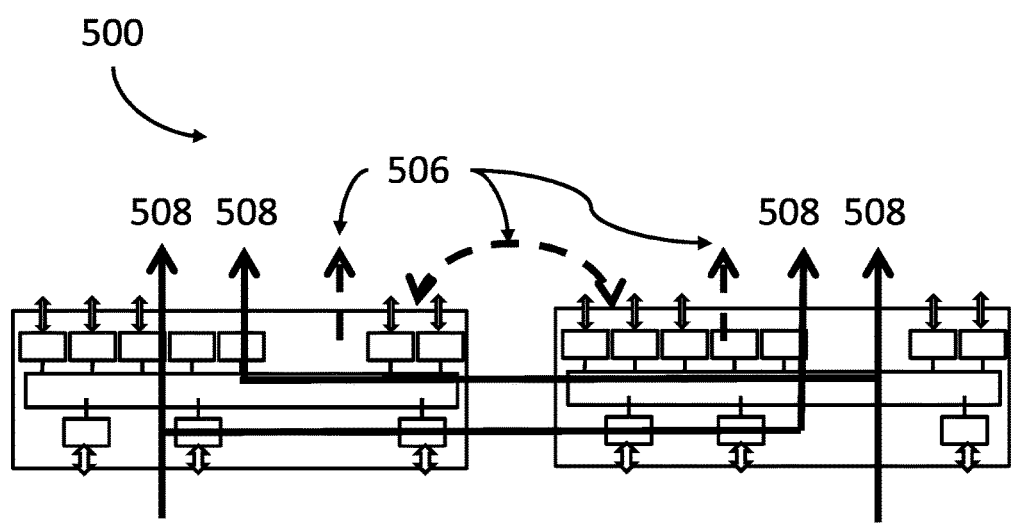

FIGS. 5a, 5b show the concept of a dragonfly switch. Referring to FIG. 5a, it may be assumed that the southbound ports 401 . . . 410 have a smaller bandwidth than the northbound ports of the multi-NIC internal switch 412. If that is the case, all southbound connected servers may communicate, 502, using the full southbound bandwidth leaving still additional excess bandwidth at the northbound side of the multi-host NIC internal switch 412. This excess bandwidth 504 at the northbound side may be leveraged for building a distributed switch comprising at least two multi-host NIC connectors 400. However, there exists a boundary condition to avoid a switch over-subscription: the combined NIC node bandwidth plus the distributed switch bandwidth at the northbound should be smaller than or equal with the internal switch bandwidth capacity.

However, the interconnected base units (compare FIG. 1) are used to build a larger virtual distributed switch. A combination of two of the multi-host NIC connectors build the dragonfly multi-host NIC controller bandwidth from the node to the outside connection.

Referring to FIG. 5b, the dotted lines 506 refer to the external switching capacity of the so built dragonfly switch 500, whereas the solid lines 508 refer to a switched connection from the southbound NICs 401 . . . 410 to northbound ports via either the left multi-host NIC controller 400 or the right multi-host NIC controller 400.

Figure 6:
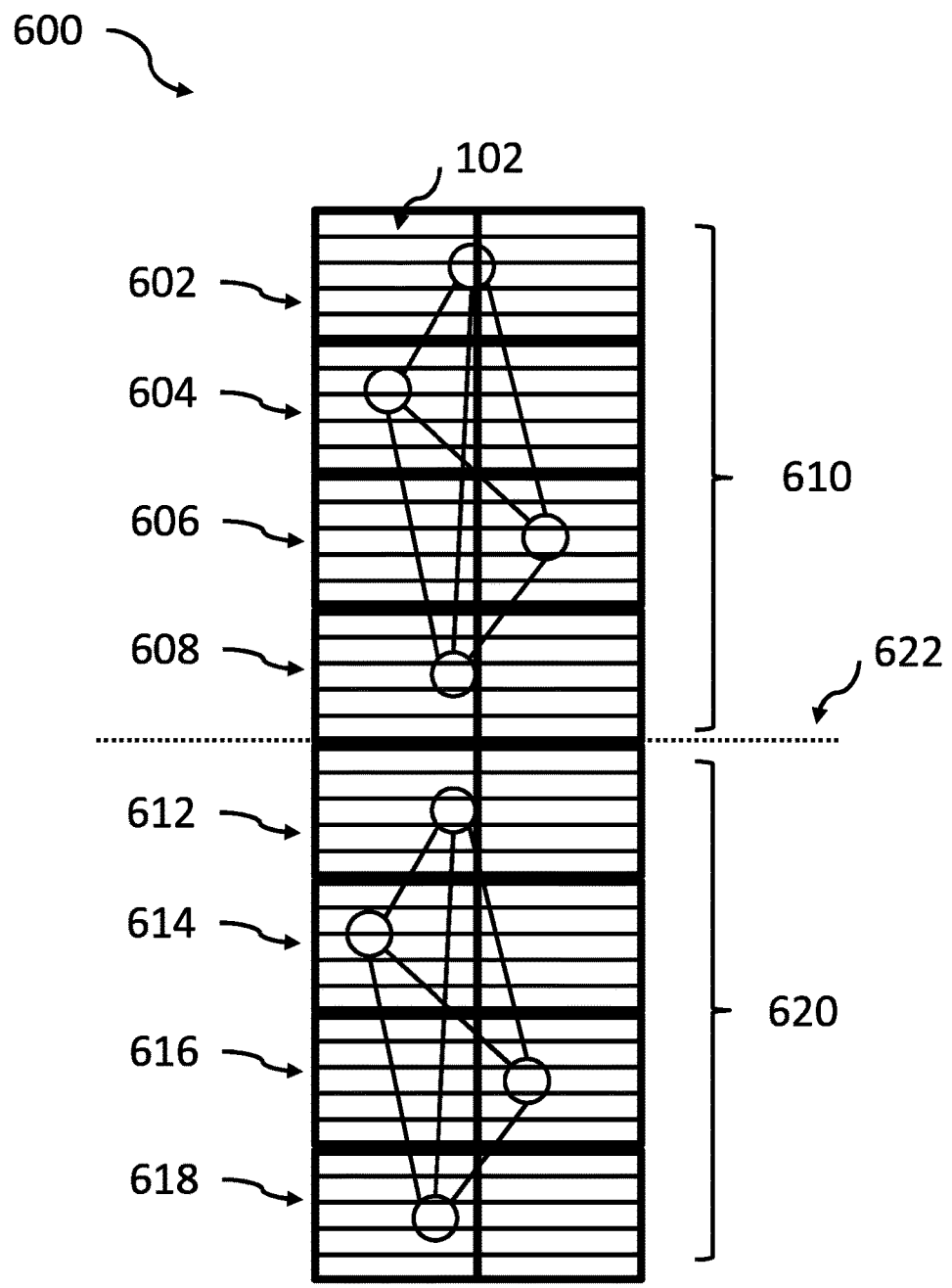
FIG. 6 shows base units combined to super units denoted as chassis in accordance with exemplary embodiments.

FIG. 6 shows base units 102 (only reference number used representational) combined to super units 602 . . . 618, also denoted as chassis 602 . . . 618. Each of these super units 602 . . . 618 comprises 10 base units (one of which has a ref.-num. 102, compare FIG. 1). Four of those super units—namely base units 602, 604, 606, 608—are combined to an x-dimension group. Such an x-dimension group 610 builds the x-dimension of the network, i.e., 40 base units. Two of those x-dimension groups 610, 620 may be combined in one industry norm rack 600. The dotted line 622 between the two chassis 610, 620 shows the logic of split in the rack 600. The circles within each super unit and the lines linking them together represent all-to-all connections of the four related chassis 602, 604, 606, 608, and respectively 612, 614, 616, 618. It may be noted that from each chassis three connections go to one of the other chassis of an x-dimension group 610, 620.

Figure 7:
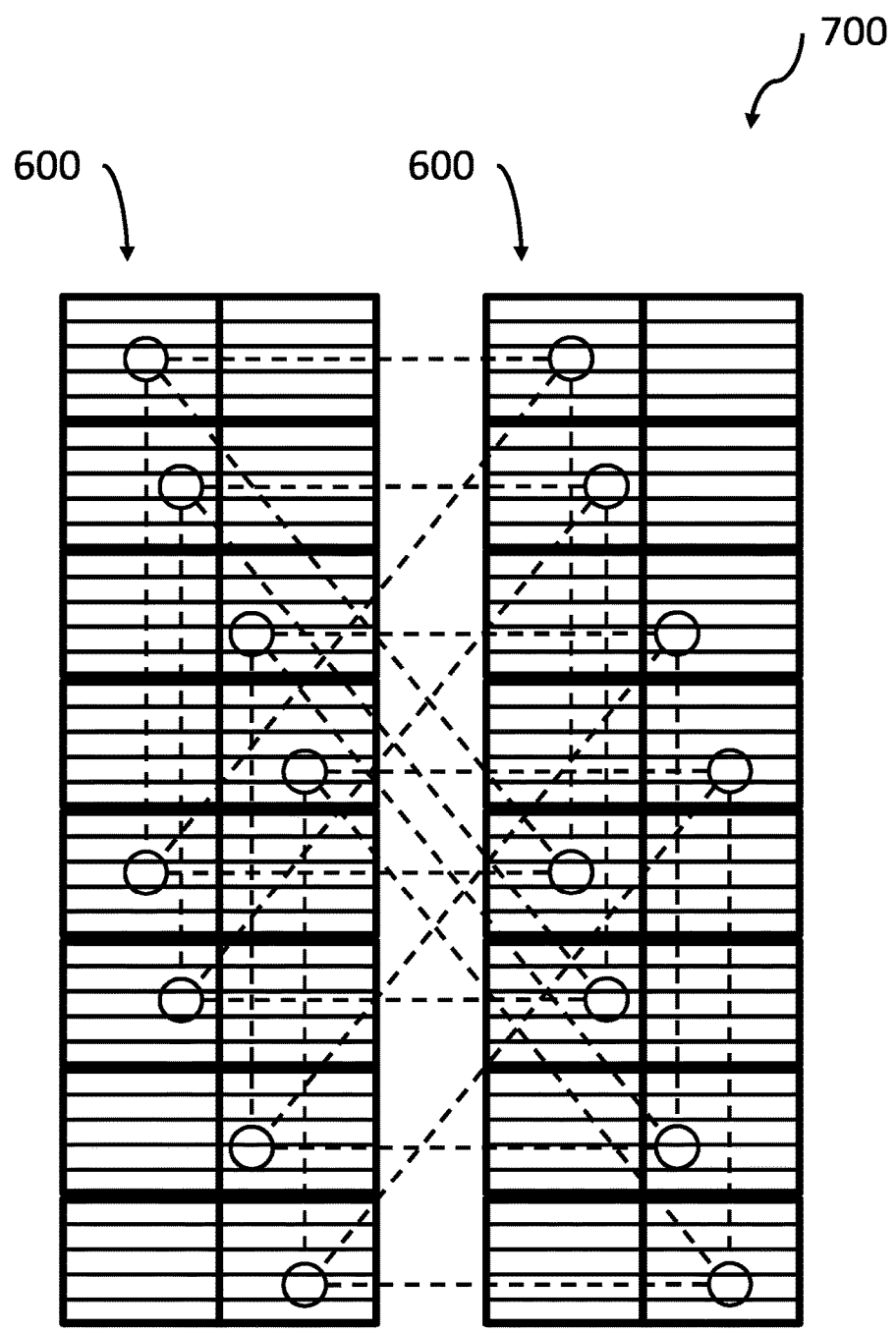
FIG. 7 shows a combination of two racks in accordance with exemplary embodiments.

FIG. 7 shows a combination of two racks 600. This builds the y-dimension group 700 of the exemplary network. Also here, all-to-all connections of respective 4 chassis are shown symbolically by the circles—one per chassis—being connected to related, other chassis. It may be noted that each x-layer—i.e., x-dimension group—spans two racks horizontally.

Figure 8:
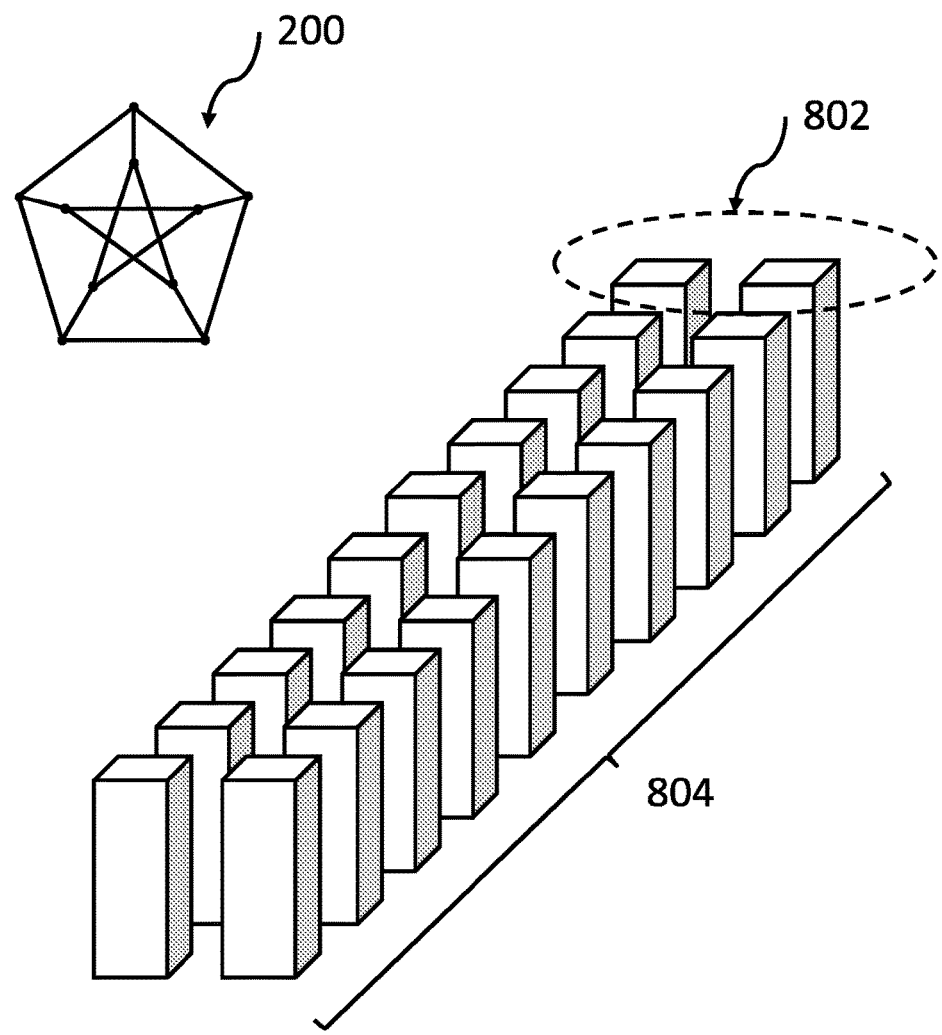
FIG. 8 shows 10 y-dimension groups building a z-dimension group of a network of a data center in accordance with exemplary embodiments.

FIG. 8 shows 10 y-dimension groups building a z-dimension group 804 of a network of a data center. One of the y-dimension groups is dotted line encircled, 802. The 10 y-dimension groups 802 are not connected in an all-to-all fashion but in a Petersen graph 200 form as explained above (compare FIG. 2). The 10 double racks 802 may also be denoted as planes of the network. Thus, the z-dimension is shown as 10 planes.

Figure 9:
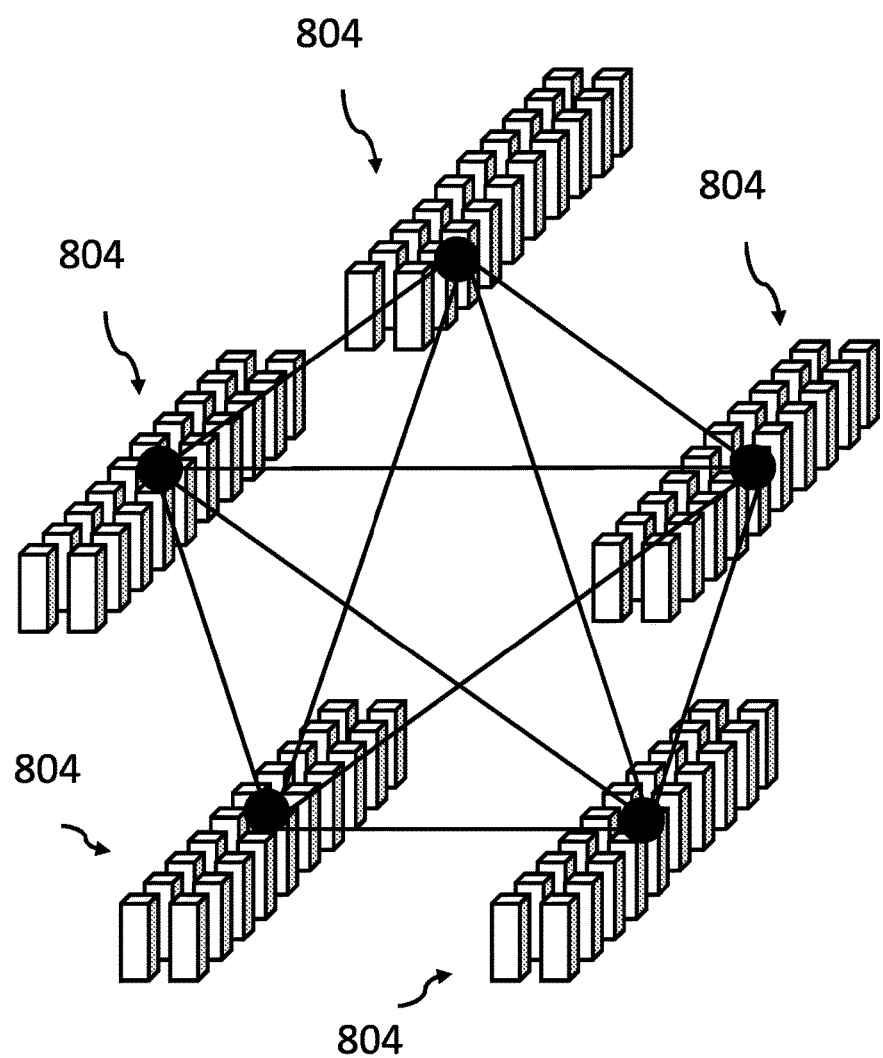
FIG. 9 shows the w-dimension of the network of the data center in accordance with exemplary embodiments.

FIG. 9 shows the w-dimension of the network of the data center. Here, five hyper planes—i.e., z-dimension groups 804—are combined with all-to-all connections between groups of 20 racks. In total 1600 cables—e.g., optical cables—may be used to build the complete data center network POD 900. The shorter distance network cables may be electrical connections.

If in one embodiment for the x-dimension and the y-dimension electrical connections and in the z-dimension optical cables may be used, then 160 optical cables (10 cables×2 columns×8 chassis) are required. If the w-dimension may also be connected with optical cables, then a total of 2.400 optical cables may have to be connected to 4,800 optical ports for 8,000 base units/sleds per POD. This may represent an average usage of 60% of the optical ports. Hence, the 100 racks of the data center POD may be connected with 2,400 optical cables which may represent a far lower number than traditional PODs with 8,000 base units (nodes) typically required, and hence lower network costs.

Figure 10:
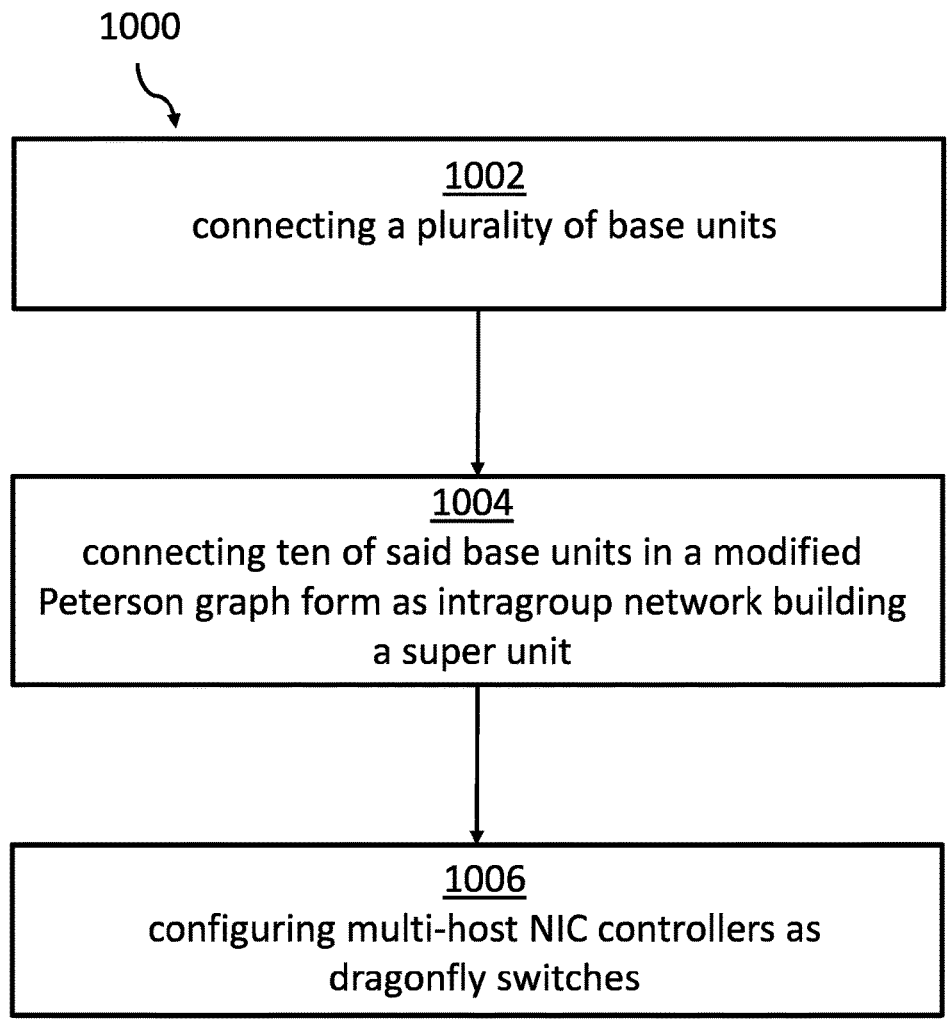
FIG. 10 shows a block diagram of representing a method for networking a plurality of nodes in a data center network in accordance with exemplary embodiments.

FIG. 10 shows a block diagram of an embodiment of the method 1000 for networking a plurality of nodes in a data center network. The method comprises connecting, 1002, a plurality of base units, each of which comprises a first set of connected nodes with southbound connections of a multi-host NIC controller. The multi-host NIC controller has northbound a higher total bandwidth than southbound.

The method comprises further connecting, 1004, ten of the base units with their respective multi-host NIC controller in a modified Peterson graph form as intragroup network building a super unit, in which each of the multi-host NIC controllers is using three northbound connections for a direct connection to other three base units, and in which two base units of each group of three base units are connected via a respective one of a fourth northbound connection to one of the other two groups of three base units. The method 1000 comprises also to connect, 1006, two multi-host NIC controllers as a respective dragonfly switch. Thus, a part of the northbound connections of the switches are used for intragroup network ports of dragonfly switches.

Figure 11:
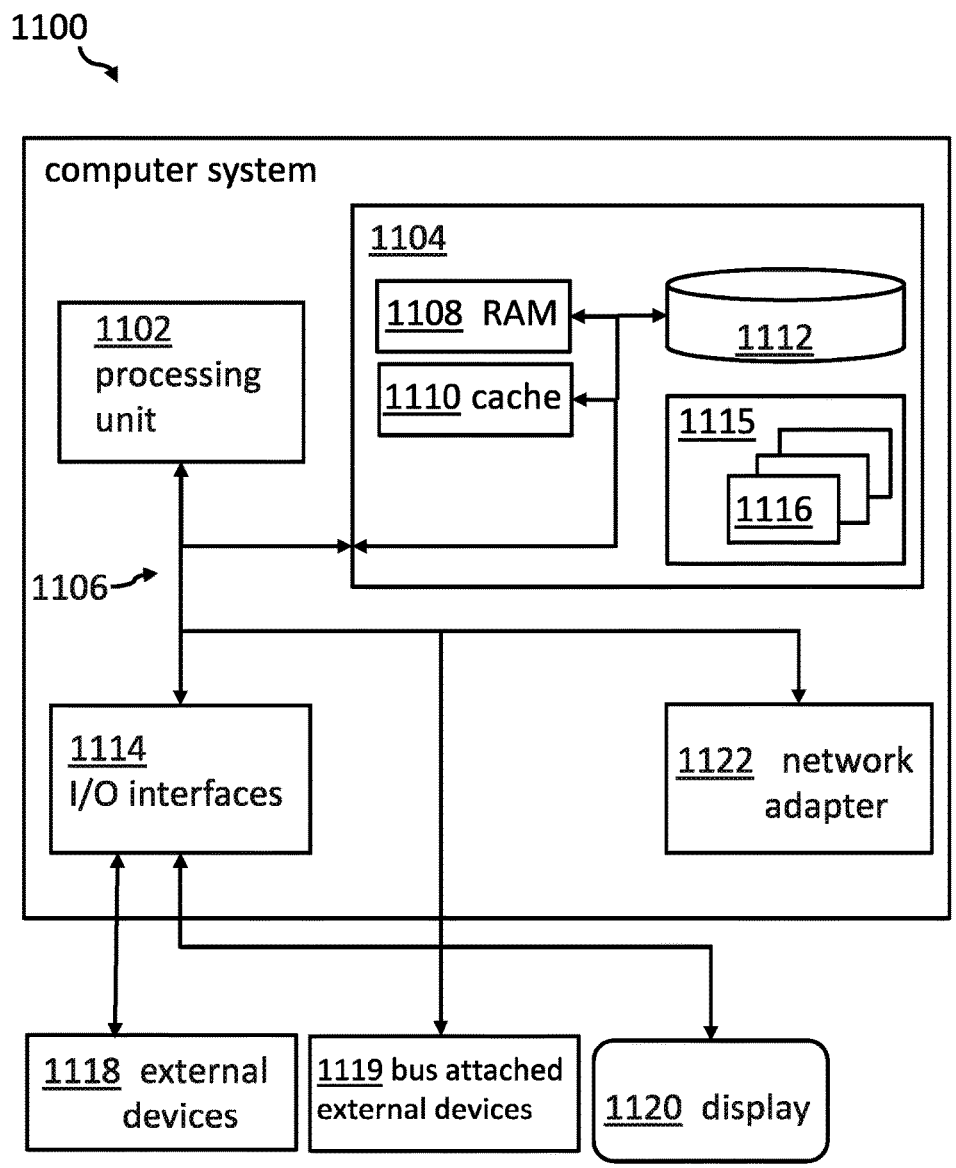
FIG. 11 shows an embodiment of a block diagram of a computing system node suitable for use in a network in accordance with exemplary embodiments.

Embodiments of the invention may be implemented together with virtually any type of computer, regardless of the platform being suitable for storing and/or executing program code. FIG. 11 shows, as an example, a computing system 1100 suitable for executing program code related to the proposed method and also as an example of a computing node.

The computing system 1100 is only one example of a suitable computer system and is not intended to suggest any limitation as to the scope of use or functionality of embodiments of the invention described herein. Regardless, computer system 1100 is capable of being implemented and/or performing any of the functionality set forth hereinabove. In the computer system 1100, there are components, which are operational with numerous other general purpose or special purpose computing system environments or configurations. Examples of well-known computing systems, environments, and/or configurations that may be suitable for use with computer system/server 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1100 may be described in the general context of computer system-executable instructions, such as program modules, being executed by a computer system 1100. Generally, program modules may include routines, programs, objects, components, logic, data structures, and so on that perform particular tasks or implement particular abstract data types. Computer system/server 1100 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1100 is shown in the form of a general-purpose computing device. The components of computer system/server 1100 may include, but are not limited to, one or more processors or processing units 1102, a system memory 1104, and a bus 1106 that couples various system components including system memory 1104 to the processor 1102. Bus 1106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus, and in particular also Peripheral Component Interconnects Express (PCIe) bus. External devices 1119, in particular a multi-host NIC may be directly attached to the bus 1106, or can be connected via an I/O interface block (1114). Computer system/server 1100 typically includes a variety of computer system readable media. Such media may be any available media that is accessible by computer system/server 1100, and it includes both, volatile and non-volatile media, removable and non-removable media.

The system memory 1104 may include computer system readable media in the form of volatile memory, such as random access memory (RAM) 1108 and/or cache memory 1110. Computer system/server 1100 may further include other removable/non-removable, volatile/non-volatile computer system storage media. By way of example only, storage system 1112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1106 by one or more data media interfaces. As will be further depicted and described below, memory 1104 may include at least one program product having a set (e.g., at least one) of program modules that are configured to carry out the functions of embodiments of the invention.

The program/utility 1115, having a set (at least one) of program modules 1116, may be stored in memory 1104 by way of example, and not limitation, as well as an operating system, one or more application programs, other program modules, and program data. Each of the operating system, one or more application programs, other program modules, and program data or some combination thereof, may include an implementation of a networking environment. Program modules 1116 generally carry out the functions and/or methodologies of embodiments of the invention as described herein.

The computer system/server 1100 may also communicate with one or more external devices 1118 such as a keyboard, a pointing device, a display 1120, etc.; one or more devices that enable a user to interact with computer system/server 1100; and/or any devices (e.g., network card, modem, etc.) that enable computer system/server 1100 to communicate with one or more other computing devices. Such communication can occur via Input/Output (I/O) interfaces 1114. Still yet, computer system/server 1100 may communicate with one or more networks such as a local area network (LAN), a general wide area network (WAN), and/or a public network (e.g., the Internet) via network adapter 1122. As depicted, network adapter 1122 may communicate with the other components of computer system/server 1100 via bus 1106. It should be understood that although not shown, other hardware and/or software components could be used in conjunction with computer system/server 1100. Examples, include, but are not limited to: microcode, device drivers, redundant processing units, external disk drive arrays, RAID systems, tape drives, and data archival storage systems, etc.

It may be noted that the above-mentioned base units may be implemented in the form of the computing system 1100. However, in one embodiment the computing system 1100 may be implemented in form of a dual socket server. In that case also some other components may be available twice, as known by a skilled person.

According to one aspect of the present invention, a data center network structure comprising a plurality of nodes may be provided. The data center network structure may comprise a plurality of base units each of which comprise a first set of nodes connected by southbound connections of a multi-host NIC controller. The multi-host NIC controller may have northbound a higher total bandwidth than southbound.

The data center network structure may also comprise a super unit comprising ten base units with their respective multi-host NIC controllers connected in a modified Peterson graph form as intragroup network, in which each of the multi-host NIC controllers is adapted for using three northbound connections for a direct connection to other three base units, and in which two base units of each group of three base units may be connected via a respective one of a fourth northbound connection to one of the other two groups of three base units. Furthermore, the multi-host NIC controllers may be configured as dragonfly switches.

According to another aspect of the present invention, a method for networking a plurality of nodes in a data center network may be provided. The method may comprise connecting a plurality of base units, each of which comprise a first set of connected nodes with southbound connections of a multi-host NIC controller. The multi-host NIC controller may have northbound a higher total bandwidth than southbound.

The method may further comprise connecting ten of the base units with their respective multi-host NIC controllers in a modified Peterson graph form as intragroup network building a super unit in which each of the multi-host NIC controllers of the base unit is using three northbound connections for a direct connection to other three base units, and in which two base units of each group of three base units are connected via a respective one of a forth northbound connection to one of the other two groups of three base units. The multi-host NIC controllers may be configured as dragonfly switches.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The proposed data center network structure may offer multiple advantages and technical effects:

The here proposed topology of a data center network structure, using as core building block a super unit—i.e., chassis—composed of a network of nodes configured and networked in a modified Peterson graph form allows to build a highly scalable data center network topology balancing more than one or two architectural constraints or boundaries. Special attention is given to a resource effective design in order to only require expensive optical cables between building blocks having a larger distance to each other.

The modified Peterson graph network topology and enables a guaranteed 1-hop connectivity between three groups of three nodes each in a 10 note core building block, i.e., a super unit or chassis. Within such a super unit, network connections may be based on the electrical connections; the same may apply for the x- and y-dimension of the data center network structure. More physically distant components—e.g., z- and w-dimension components of the data center network structure—may be connected with optical cables. This may reduce the requirement for optical cables dramatically by allowing an average use of 60% of optical ports only in a POD (Point of Delivery) comprising 100 racks with 80 base units or nodes per rack. Thus, only 2.400 optical cables may be required to scale up to 100 racks. This may represent a much more cost-effective data center network topology than in traditionally used data center network topologies. Hence, the here proposed core building block of the super unit, connected in a modified Peterson graph form may balance classical design boundaries of data center networks, namely the selected network hierarchy, the number of ports per switch, the network dimension (2D, 3D, nD), the reach of one hop and a total number of hops required to reach a destination node within the data center, as well as networking costs.

In the following, further embodiment of data center network structure—also applicable to the related method—will be described.

According to one advantageous embodiment of the data center network structure, one—i.e., at least one—of the base units may comprise one additional northbound connection adapted to be used as external—i.e., northbound—connection to the intragroup network. Thus, the super unit may be used as a core network topology structure for configuring larger data center networks using the super units as core building blocks.

According to one preferred embodiment of the data center network structure, each base unit in each of the three groups of three base units may comprise at least one northbound connection, such that each of the groups of three base units may enable three group outbound connections. One of those three group outbound connections may be used as northbound connections in an x-dimension of the data center network structure, another of those three group outbound connections may be used as northbound connections in a y-dimension of the data center network structure, and a last one of the three group outbound connections may be used as northbound connections in a z-dimension of the data center network structure. Thus, the proposed topology may build a core structure for a highly scalable data center network with thousands or 10,000s of computing nodes, accelerators, storage nodes, and so on.

According to one permissive embodiment of the data center network structure, each base unit may comprise at least one server. However, more than one server may be provided per base unit depending on the southbound capacity of the used multi-host NIC connectors. An exemplary base unit may be implemented as a dual-socket server (two CPU sockets) with one multi-host NIC connector. However, instead of one dual-socket server other configurations are possible: a plurality of single-socket servers or a server with even more sockets for CPUs than only two. Additionally, also computing accelerators—e.g., comprising dedicated computing units like, e.g., graphic computing units, encryption units, storage nodes, and so on—are possible. Also the number of PCIe connections of a server may be variable to use one or more connections between the server and the southbound connection of the multi-host NIC controller. This may allow for a high flexibility of the configuration of the base units.

According to additionally preferred embodiment of the data center network structure, the remaining base unit, out of the ten base units not being part of one of the groups of three base units, may also comprise a northbound connection. It may be used for further scalability options or as user or administrator I/O to the super unit.

According to one further advantageous embodiment of the data center network structure, each base unit in the groups of three base units not comprising a fourth northbound connection, may also comprise a fourth northbound connection usable as additional connections building northbound connections in a w-dimension of the data center network structure. These additional connections to the core structure of the super unit may be used as additional dimension scalability option for the data center network topology.

According to one preferred embodiment of the data center network structure, four super units may be connected in an all-to-all form building an x-dimension unit of the data center network structure. If a super unit may have the size of $\frac{1}{8}^{th}$ of a typical 19 inch rack, four super units need half of such a rack. Thus, electrical and mechanical infrastructure components typically used in data centers may also be used for the newly proposed core structure of the super unit of a highly scalable data center network structure.

According to a further preferred embodiment of the data center network structure, four x-dimension units—i.e., 2 racks—may be connected in an all-to-all form building a y-dimension group of the data center network structure. Again, it proves that the chosen architecture of using 10 super units in one chassis is using available infrastructure components in a very efficient manner. The base structure of 10 base units configured in a modified Peterson graph form is using already available infrastructure components efficiently.

According to a further advantageous embodiment of the data center network structure, ten y-dimension groups—i.e., 10 planes, each plane having 2 racks resulting in 20 racks—may be connected according to a (traditional) Peterson graph form building the z-dimension group of the data center network structure. It may be noted that each Peterson graph comprises 10 nodes and requires 15 vertices/cables inside. It may also be noted that, in order to connect the super units or chassis of the y-dimension groups, may require a plurality of Peterson structures. This dimension of the data center network structure may rely on known topologies. Thus, combining the modified Peterson graph form of the core unit—i.e., the super unit—with known data center network topologies may allow a highly reliable cost and resource-effective network structure optimizing not only performance but also takes into account costs for required cabling in electrical and/or optical form.

According to one additional permissive embodiment of the data center network structure, five z-dimensions groups may be connected in an all-to-all fashion building a POD of the data center network structure. Such a POD may comprise a minimum of 8,000 servers in 100 racks which may build a typical size of a traditional or alternatively cloud computing data center.

According to some embodiments, any additionally available northbound connections of the multi-host NIC controllers may be used to implement a physically separate service network. Accordingly, additional northbound connections may be used, which might be available in a 'real-world' multihost NIC, to implement a physically separate (i.e. additional) data center wide network, which can be used for service/management. Such a network is important in cloud data centers, because when the 'normal' network is blocked/interrupted for whatever reason, the data center operator can access the super units and its nodes via a separate network to manage and/or service the nodes and/or the multihost NIC.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The invention claimed is:

1. A data center network structure comprising:
   at least ten base units each of which comprises a set of nodes connected by southbound connections of corresponding multi-host network interface controllers, said multi-host network interface controllers having northbound a higher total bandwidth than southbound, each base unit also comprising a corresponding multi-host network interface controller; and
   a super unit comprising the ten base units with their respective multi-host network interface controllers connected in a modified Peterson graph form as an intragroup network such that the ten base units of the super unit comprise three groups each including three of the ten base units, in which each of said multi-host network interface controllers is configured to use three northbound connections for a direct connection to three other base units of the super unit, and in which two base units of each of the groups are connected via a respective one of a fourth intragroup northbound connection to one of said other two groups, and a remaining base unit out of said ten base units not being part of one of the three groups of three base units is configured to use three northbound connections for a direct connection to one base unit in each of the three groups, and wherein said multi-host network interface controllers are configured as dragonfly switches,
   wherein each base unit in said groups of three base units also comprises an additional fifth northbound electrical connection usable as additional network connections building northbound connections between super units of said data center network structure, and
   wherein the remaining base unit out of said ten base units not being part of one of the three groups of three base units comprises a fourth and a fifth northbound connection, and wherein the fifth northbound connection is used to either scale to higher dimensions of the data network structure or for communication to and from an outside of said data network structure.

2. The data center network structure according to claim 1, wherein one of the ten base units comprises one additional northbound connection configured to be used as an external connection to said intragroup network.

3. The data center network structure according to claim 2, wherein any additionally available northbound connections of said multi-host network interface controllers are used to implement a physically separate service network.

4. The data center network structure according to claim 1, wherein each base unit comprises at least one server as part of the corresponding set of nodes in the base unit.

5. The data center network structure according to claim 1, wherein the remaining base unit out of said ten base units not being part of one of the three groups of three base units comprises the fourth northbound connection, which used for communication to and from the outside of said network structure.

6. A data center network structure comprising:
   at least ten base units each of which comprises a set of nodes connected by southbound connections of corresponding multi-host network interface controllers, said multi-host network interface controllers having northbound a higher total bandwidth than southbound, each base unit also comprising a corresponding multi-host network interface controller; and
   a super unit comprising the ten base units with their respective multi-host network interface controllers connected in a modified Peterson graph form as an intragroup network such that the ten base units of the super unit comprise three groups each including three of the ten base units, in which each of said multi-host network interface controllers is configured to use three northbound connections for a direct connection to three other base units of the super unit, and in which two base units of each of the groups are connected via a respective one of a fourth intragroup northbound connection to one of said other two groups, and a remaining base unit out of said ten base units not being part of one of the three groups of three base units is configured to use three northbound connections for a direct connection to one base unit in each of the three groups, and wherein said multi-host network interface controllers are configured as dragonfly switches,
   wherein each base unit in said groups of three base units also comprises an additional fifth northbound electrical connection usable as additional network connections building northbound connections between super units of said data center network structure, and in which said fifth northbound connection enables four group outbound connections, wherein:
   the three group outbound connections of a first one of the groups are for northbound connections in an x-dimension of said data center network structure,
   the three group outbound connections of a second one of the groups are for northbound connections in a y-dimension of said data center network structure,
   the three group outbound connections of a third one of the groups are for northbound connections in a z-dimension of said data center network structure, and
   the remaining outbound connections are for scaling to higher dimensions of said data center network structure or are used for communication to and from the outside of said data network structure.

7. The data center network structure according to claim 6, wherein four super units are connected in an all-to-all form building an x-dimension unit of said data center network structure.

8. The data center network structure according to claim 7, wherein four x-dimension units are connected in an all-to-all form building a y-dimension group of said data center network structure.

9. The data center network structure according to claim 8, wherein ten y-dimension groups are connected according to a Peterson graph form building said z-dimension group of said data center network structure.

10. The data center network structure according to claim 9, wherein five z-dimensions groups are connected in an all-to-all fashion building a POD of said data center network structure.

11. A method for networking in a data center network structure, said method comprising:
   connecting in the data center network structure at least ten base units each of which comprise a set of connected nodes with southbound connections of corresponding multi-host network interface controllers, said multi-host network interface controllers having northbound a higher total bandwidth than southbound, each base unit also comprising a corresponding multi-host network interface controller;
   connecting in the data center network structure the ten base units with their respective multi-host network interface controllers in a modified Peterson graph form as an intragroup network to build a super unit such that the ten base units of the super unit comprise three groups including three of the ten base units, in which each of said multi-host network interface controllers is using three northbound connections for a direct connection to three other base units of the super unit, and in which two base units of each of the groups are connected via a respective one of a fourth northbound connection to one of said other two groups of three base units, and a remaining base unit out of said ten base units not being part of one of the three groups of three base units is configured to use three northbound connections for a direct connection to one base unit in each of the three groups, wherein said multi-host network interface controllers are configured as dragonfly switches, wherein each base unit in said groups of three base units also comprises an additional fifth northbound electrical connection usable as additional network connections building northbound connections between super units of said data center network structure, and wherein the remaining base unit out of said ten base units not being part of one of the three groups of three base units comprises a fourth and a fifth northbound connection, and wherein the fifth northbound connection is used to either scale to higher dimensions of the data network structure or for communication to and from an outside of said data network structure.

12. The method according to claim 11, wherein one of said base units comprises one additional northbound connection configured to be used as an external connection to said intragroup network.

13. The method according to claim 12, wherein any additionally available northbound connections of said multi-host network interface controllers are used to implement a physically separate service network.

14. The method according to claim 11, wherein each base unit comprises at least one server as part of the corresponding set of nodes in the base unit.

15. The method according to claim 11, wherein the remaining base unit out of said ten base units not being part of one of said groups of three base units comprises a fourth northbound connection used for communication to and from the outside of said network structure.

16. A method for networking in a data center network structure, said method comprising:

connecting in the data center network structure at least ten base units each of which comprise a set of connected nodes with southbound connections of corresponding multi-host network interface controllers, said multi-host network interface controllers having northbound a higher total bandwidth than southbound, each base unit also comprising a corresponding multi-host network interface controller;

connecting in the data center network structure the ten base units with their respective multi-host network interface controllers in a modified Peterson graph form as an intragroup network to build a super unit such that the ten base units of the super unit comprise three groups including three of the ten base units, in which each of said multi-host network interface controllers is using three northbound connections for a direct connection to three other base units of the super unit, and in which two base units of each of the groups are connected via a respective one of a fourth northbound connection to one of said other two groups of three base units, and a remaining base unit out of said ten base units not being part of one of the three groups of three base units is configured to use three northbound connections for a direct connection to one base unit in each of the three groups, wherein said multi-host network interface controllers are configured as dragonfly switches, in which each base unit in each of said three groups of three base units comprises at least one fifth northbound connection, such that each of the three groups enables three group outbound connections, wherein:

the three group outbound connections of a first one of the groups are for northbound connections in an x-dimension of said data center network structure, the three group outbound connections of a second one of the groups are for northbound connections in a y-dimension of said data center network structure, the three group outbound connections of a third one of the groups are for northbound connections in a z-dimension of said data center network structure, and the remaining outbound connections are for scaling to higher dimensions of said data center network structure or are used for communication to and from the outside of said data network structure.

17. The method according to claim 16, wherein four super units are connected in an all-to-all form building an x-dimension unit of said data center network structure.

18. The method according to claim 17, wherein four x-dimension units are connected in an all-to-all form building a y-dimension group of said data center network structure.

19. The method according to claim 18, wherein ten y-dimension groups are connected according to a Peterson graph form building said z-dimension group of said data center network structure.

20. The method according to claim according to claim 19, wherein five z-dimensions groups are connected in an all-to-all fashion building a POD of said data center network structure.

21. A computer program product comprising a non-transitory computer readable storage medium having program instructions embodied therewith, said program instructions being executable by one or more computing systems to cause said one or more computing systems to perform the method of claim 11.

22. A computer program product comprising a non-transitory computer readable storage medium having program instructions embodied therewith, said program instructions being executable by one or more computing systems to cause said one or more computing systems to perform the method of claim 16.

* * * * *